July 21, 1942.  A. P. D. BELANGER  2,290,311
LOCK BOLT MEANS
Filed April 15, 1939
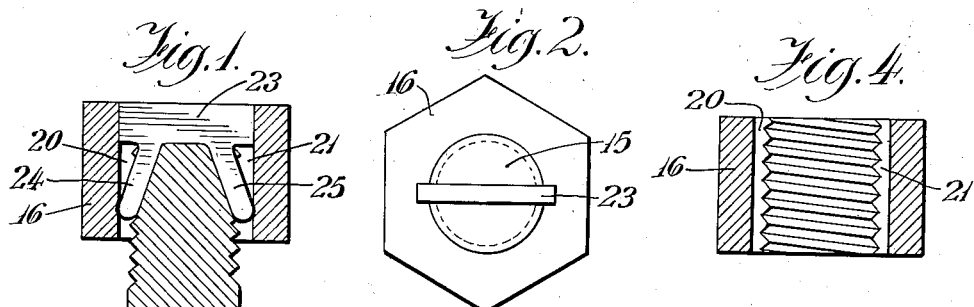
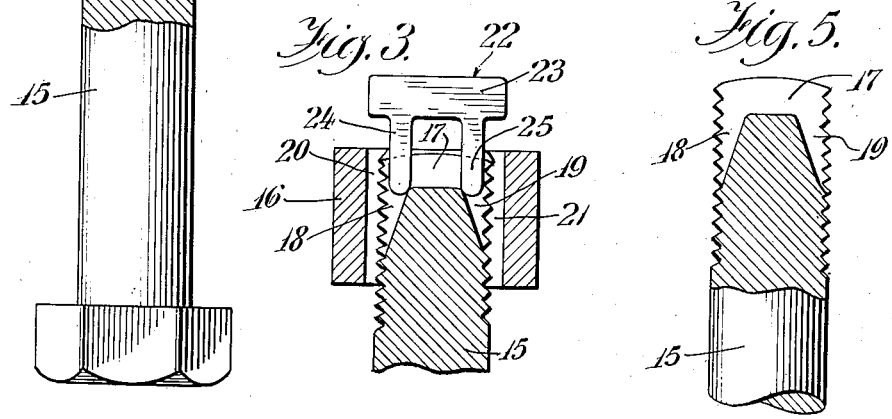
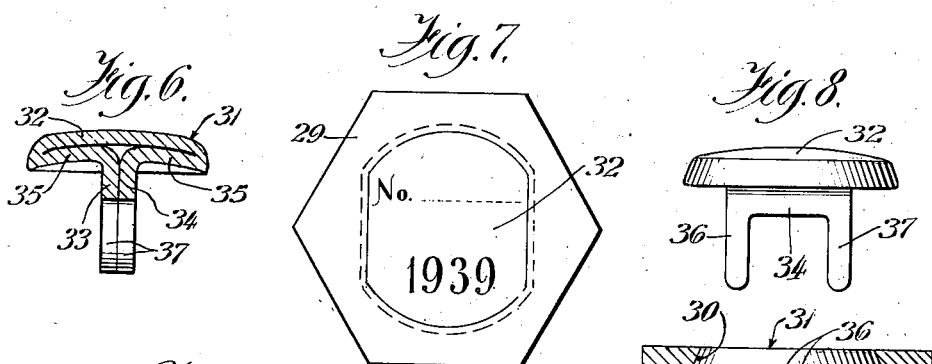
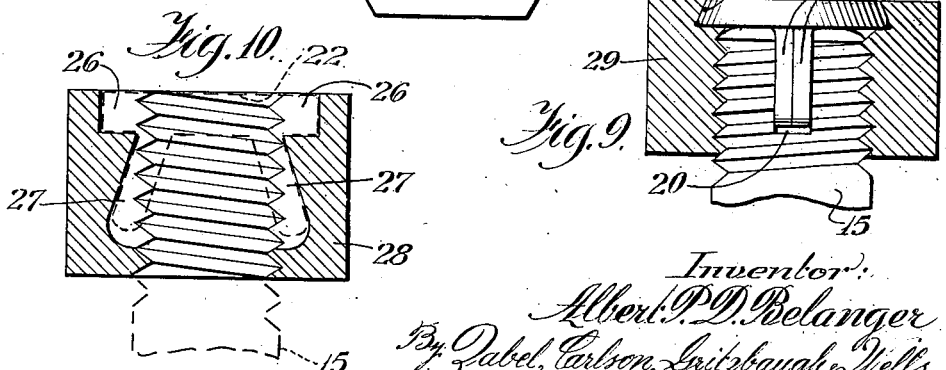
Inventor:
Albert P. D. Belanger
By Zabel, Carlson, Gritzbaugh & Wells
Attorneys.

Patented July 21, 1942

2,290,311

UNITED STATES PATENT OFFICE 2,290,311

LOCK BOLT MEANS

Albert P. D. Belanger, Chicago, Ill.

Application April 15, 1939, Serial No. 267,974

3 Claims. (Cl. 151—29)

This invention relates to improvements in lock bolts and in particular to improved securing means of the type in which the strength and permanence thereof make such bolts suitable for use in structural steel work in place of the usual rivets.

The use of rivets is often objectionable because of the difficulty of heating the rivets or of transporting the heated rivets to the place where it is desired to use them. In other instances, the lack of space available at the place of work prevents the use of riveting apparatus. Furthermore, when it is desired to secure together several structural members, a rivet of greater than ordinary length is required, the use of which presents an additional difficulty in that the portable rivet heating means in ordinary use is not suitable for operation on long rivets. Furthermore, it is often desired to secure two or more wooden members together, or a wooden and a steel member, in which event red hot rivets cannot be used because the heat of the rivet will burn or char the wood.

My invention provides in general a nut and a bolt of novel design, together with a special key with which they may be non-rotatably secured with respect to each other, the construction being such as to retain the key permanently in place so that it cannot become loosened or removed. The preferred form of key comprises a plate portion adapted to carry data stamped or printed thereon, the plate being arranged for interlocking engagement with the nut.

It is another object of my invention to improve devices of this type in sundry details as hereinafter set forth. The preferred forms of construction are shown by the accompanying drawing in which like reference numerals refer to like parts—

Fig. 1 is a side elevation of one form of my invention, the elevation being in partial section and showing the elements completely assembled;

Fig. 2 is an end view of the parts shown in Fig. 1;

Fig. 3 is a central sectional view similar to a portion of Fig. 1 but illustrating the elements before final assembly;

Fig. 4 is a central sectional view through the nut of Fig. 1;

Fig. 5 is a view similar to a portion of Fig. 3, showing the bolt with the other parts removed;

Fig. 6 is a section through a modified form of key;

Fig. 7 is a plan view of the key of Fig. 6 in assembled relation to a nut;

Fig. 8 is a side elevation of the key shown in Fig. 6;

Fig. 9 is a central sectional view partly in side elevation showing a nut and key of the type illustrated in Fig. 7 as applied in locked position on a bolt; and Fig. 10 is a central sectional view through a preferred form of nut, with a bolt and key shown in dotted lines.

Referring now to Figs. 1 to 5 of the drawing, 15 indicates a bolt having a nut 16 secured by means of screw threads thereon. In the form of bolt illustrated (see Fig. 5) the bolt 15 is provided with a groove 17 at its end, with side groove portions 18 and 19 communicating with said groove portion 17, the groove portions 18 and 19 being in convergent position with respect to each other toward the end of the bolt. The nut 16 (see Fig. 4) is provided with grooves 20 and 21 at opposite sides thereof in such position as to be capable of being brought into registry with the groove of the bolt when the nut is mounted upon the bolt.

In use, the bolt 15 is to be inserted through suitable close fitting openings in the parts to be connected, and the nut 16 is to be tightened upon the end of the bolt, into preferably about the position as shown in Fig. 3 with the end of the bolt substantially flush with the outer face of the nut. The nut is to be turned in such tightened position so as to bring the grooves 20 and 21 of the nut into registry with the transverse slot of the bolt, whereupon a key 22 is brought into position to be driven into the grooves. In the arrangement shown, the key member 22 comprises a body portion 23 and spaced prongs 24 and 25, the key being preferably of such dimensions as to fill completely the grooves in the bolt and the nut, as is clearly shown in Fig. 2, the arrangement being such that the key has a driving fit in the grooves. As will be readily understood, when the key advances downwardly from the position as shown in Fig. 3, the prongs 24 and 25 are necessarily spread outwardly at opposite sides of the body portion of the bolt, this action being permitted by the inherent ductility of the metal from which the key is produced, the key being preferably in the form of a stamping. The arrangement is such that when the key is brought to its final operative position with its outer edge flush with the outer face of the nut, the end of the prongs 24 and 25 are forced into strongly wedged relation between the nut and the bolt. The arrangement is designed to be such that the prongs 24 and 25 and the engaged face portions of the grooves in the nut are deformed slightly so as to very slightly enlarge the grooves so as to cause a positive locking of the key with the nut. Whether or not such positive locking takes place, the wedging is very tight so as to hold the key very strongly in position so as to resist any ordinary efforts to dislodge the key from position.

I have found by the use of my improved arrangement that it is practically impossible to remove one of my locking keys 22 after it has been driven into operative position as shown in Fig. 1. Substantially the only way available for removing the bolt is to destroy the bolt, making it thus highly acceptable for use as a substitute for a rivet. Inasmuch as no heat is required in connection with the application of the bolt, the bolt can be used to advantage at any point under any conditions which permit insertion of the bolt into position. After the bolt is inserted in position, it can be held from rotating by the application of a screw-driver or similar instrument to the groove 17 while the nut 16 is being applied and tightened. The key can then be driven into position, whereupon the assembly is complete. If the key 22 should extend very slightly beyond the outer face of the nut, such extending portion could be very readily ground or filed away for bringing the parts into flush relation to each other.

The arrangement shown in Fig. 10 is similar to that above described, except with respect to the formation of the grooves in the nut. In the arrangement shown in Fig. 10, the side grooves are terminated short of the inner face of the nut. In this construction, the groove at each side comprises a straight portion 26 near the outer face of the nut and an obliquely disposed portion 27 communicating with the straight portion 26. The arrangement is such that the key 22 as shown in Fig. 10 has under-lapping engagement with the undercut groove portions 27 so as to act positively for holding the key 22 in position without having to rely upon any deformation of the nut brought about by the operation of driving the key into position. The nut in this arrangement is indicated by the reference character 28.

Referring now to the construction shown in Figs. 6 to 9, the arrangement of the nut and bolt is quite similar to the arrangement of the corresponding parts in Figs. 1 to 5, but the key member is quite substantially different. The bolt 15 as shown in Fig. 9 is the same as the bolt of Fig. 1, the nut 29 being the same as the nut 16 except that it is provided with an additional undercut opening 30 in its outer face portion in concentric relation to the axis of the nut. An improved key 31 is provided, such key comprising a plate portion 32 and arms 33 and 34 formed integrally with turned back plate portions 35. Each of the arms 33 and 34 is cut out to provide spaced prongs 36 and 37 which correspond with the prongs 24 and 25 of the arrangement shown in Fig. 1. The plate 32 and the turned back plate portions 35 are bowed upwardly toward the middle of the plate 32, and the parts are of such size that the key can be readily inserted into the opening 30 of the nut 29 under normal conditions.

With the bolt 15 in position and the nut 29 tightened thereon, the key 31 is placed in position with the prongs 36 and 37 extending into the grooves of the bolt and the nut. The key is then driven into position and the plate 32 is caused to enter the opening 30 of the nut, after which the plate 32 and the parts 35 of the key are flattened into flush relation with the outer face of the nut, as shown in Fig. 9. This flattening of the bowed portions of the key causes the key to expand into very secure engagement with the undercut opening 30 of the nut so that the key 31 is held in position both by the action of the prongs 36 and 37 and by the engagement of the expanded plate 32 with the undercut opening 30. The plate 32 is designed to be of such size as to be capable of carrying a considerable amount of subject matter stamped or printed thereon, as shown in Fig. 7.

Although there has been described herein only a limited number of the preferred embodiments of this invention, it is to be understood that various modifications in the combinations of the elements and changes in the shape, size and construction of the parts may be effected without departing from the spirit of the invention as set forth in the claims.

I claim:

1. In a lock bolt means, the combination of a bolt having a transversely positioned groove portion at the end and communicating groove portions at opposite sides converging toward the end of the bolt, a nut grooved at opposite sides with the outer face portions of the grooves diverging from the outer face of the nut, and a key adapted to be driven into said grooves having prongs in position to be spread and permanently distorted by engagement with the grooves in the bolt into positive locking relationship with the obliquely disposed faces of the grooves in said nut so as to hold the nut against rotation on the bolt and to resist removal of the key from the nut.

2. In a lock bolt means, the combination of a bolt having a transversely disposed groove in its end portion, a nut having an undercut opening in its outer face, and a key having an outwardly bowed body portion adapted normally to enter the undercut opening in the nut and of such size as to have a strong gripping fit in said opening when expanded by straightening out the bowed body and having a plate portion engaging the groove in the bolt for holding the nut against rotation on the bolt.

3. In a lock bolt means, the combination of a bolt having a transversely disposed groove in its end portion with communicating groove portions at opposite sides converging toward the end of the bolt, a nut having an undercut opening in its outer face thereabout and having grooves at opposite sides of the nut extending longitudinally from said opening in position to register with the groove in the bolt, and a key having a bowed body portion adapted readily to enter said undercut opening and of such size as to have a strong gripping fit in said opening when straightened and having prongs in spaced relation to each other adapted to be spread and permanently distorted by engagement with the groove in the bolt and to be pressed inwardly by engagement with the grooves in the nut into strong holding engagement with the bolt.

ALBERT P. D. BELANGER.